A. B. WALLEM.
VALVE.
APPLICATION FILED AUG. 1, 1911.

1,024,236.

Patented Apr. 23, 1912.

WITNESSES:
J. McIntosh
J. F. Collins

INVENTOR
Axel B. Wallem
BY
Edmunds & Edmunds
ATTORNEYS

UNITED STATES PATENT OFFICE.

AXEL B. WALLEM, OF CYNWYD, PENNSYLVANIA, ASSIGNOR TO HARRISON SAFETY BOILER WORKS, OF PHILADELPHIA, PENNSYLVANIA, A CORPORATION OF PENNSYLVANIA.

VALVE.

1,024,236.

Specification of Letters Patent. Patented Apr. 23, 1912.

Application filed August 1, 1911. Serial No. 641,730.

*To all whom it may concern:*

Be it known that I, AXEL B. WALLEM, a citizen of the United States, residing at Cynwyd, in the county of Montgomery and State of Pennsylvania, have invented certain new and useful Improvements in Valves, of which the following is a specification.

This invention relates to valves for controlling the flow of a fluid, such, for instance, as steam.

The invention is directed to the provision of a valve for use in a steam system including a prime-mover, such as a reciprocating steam-engine, and a low-pressure prime-mover, such as a steam-turbine, operated by the exhaust-steam flowing from the high-pressure engine, the function of the valve being to control the flow of the exhaust-steam in the pipe leading from the engine to the turbine. In such a system, a condenser would be employed with the low-pressure turbine, and in the operation of the apparatus a vacuum might be created in the pipe carrying the exhaust-steam.

The object of this invention is to provide a valve for use in such an exhaust-steam pipe, and so constructed that it will operate automatically to close the passage for the exhaust-steam under predetermined conditions, whereby the vacuum in the exhaust-steam pipe will not extend to the side of the valve toward the high-pressure engine.

The valve constructed in accordance with the invention comprises a casing, within which are one or more movable valve-members held yieldingly upon their seats and raised from their seats by the steam-pressure thereon; and in conjunction with these movable valve-members, are employed auxiliary valve-members subjected to atmospheric pressure and arranged to actuate the main valve-members under predetermined pressure conditions.

Figure 1:
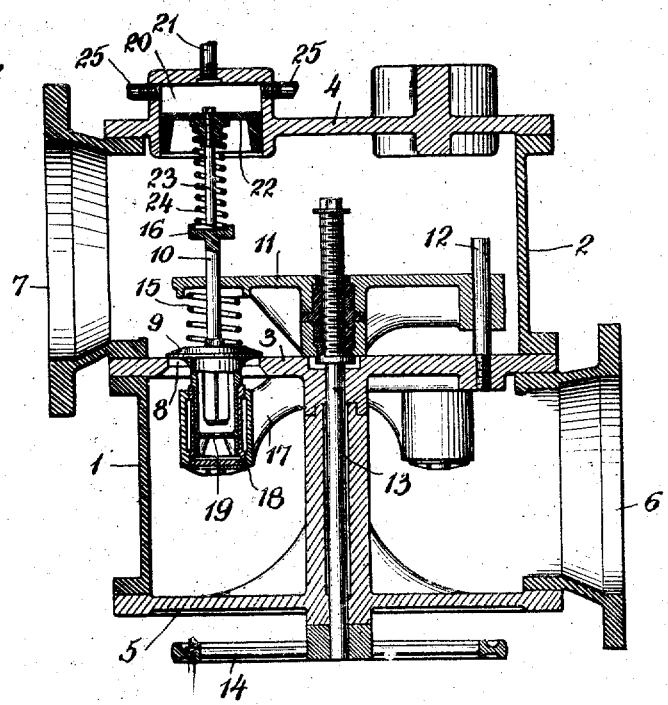
Figure 2:
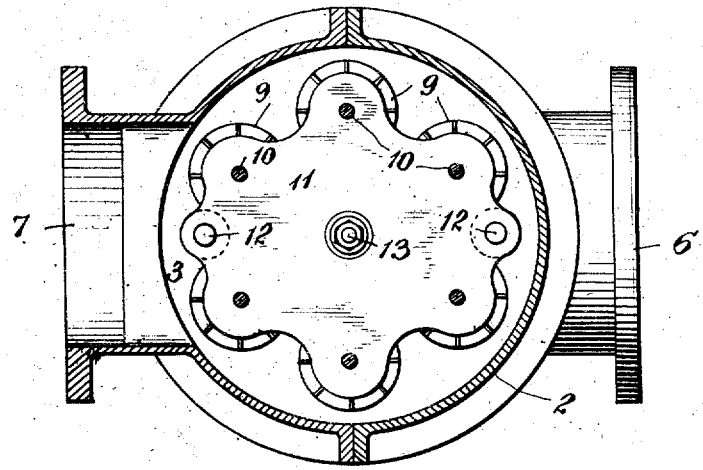

The preferred embodiment of the invention is illustrated in the accompanying drawings, in which Figure 1 is a sectional view of the valve, and Fig. 2 is a section on a plane transverse to the plane of the section of Fig. 1.

Referring to these drawings, the valve consists of a casing formed of two cylindrical members 1 and 2, a plate 3 between them, and headers 4 and 5 closing opposite ends of the members 1 and 2. The member 1 is formed to provide an inlet opening 6, and the member 2 is formed to provide an outlet opening 7. In the plate 3, are a plurality of openings 8, through which steam may pass in flowing through the valve, and the walls about these openings form seats for a plurality of movable valve-members 9, each of which is adapted to close one of the openings 8. Each of the valve-members 9 is provided with a stem 10, and all of the stems 10 pass through openings in a pressure-plate 11, which is movable toward and away from the seats of the valves 9. Rods 12, projecting upwardly from the plate 3 through openings in plate 11, serve as guides for the pressure-plate in its movement and preclude rotational movement of the pressure-plate. At the center of the pressure-plate is a threaded opening which receives the threaded end of a rod 13 mounted for rotation in suitable bearings and projecting at one end through the header 5, which end is provided with a suitable handle 14, whereby the rod 13 may be turned from outside the casing of the valve, so as to cause movement of pressure-plate 11 axially of rod 13.

Each of the valve-members 9 is held yieldingly upon its seat by a coil-spring 15 engaging the valve-member at one end and a seat upon the pressure-plate 11 at the other. Each of the stems 10 of the valves 9 is provided with a head 16, larger than the opening for the stem through pressure-plate 11. By turning the handle 14, rod 13 is rotated and pressure-plate 11 moved so as to regulate the pressure of all of the springs 15 simultaneously. Also, by turning the handle 14 in the opposite direction, plate 11 may be moved into engagement with the heads 16, so as to raise all of the valves 9 positively from their seats.

Each of the valves 9 is preferably provided with a dash-pot to regulate its movements. Arms 17, one for each valve 9, are formed integral with the plate 3, and each of these carries a cylinder 18. Each cylinder receives a piston 19 secured to or formed integral with the valve 9. The cylinder 18 is partially filled with a suitable liquid and the piston 19 is provided with a small opening through which this liquid may flow.

The header 4 of the casing of the valve is formed to provide a plurality of chambers 20, one for each of the valves 9, and each of these chambers is connected to the atmosphere, as, for instance, by means of a pipe 21. In each chamber 20, is an auxiliary valve-member 22, provided with a stem 23, the latter being in axial alinement with the stem 10 of the corresponding valve 9. A spring 24 is coiled about the stem 23, one end of the spring being secured to the valve 22 and the opposite end extending slightly beyond the end of the stem 23. Means are provided for preventing air in the chambers 20 from leaking into the passageway for the steam through the valve. In the present instance, pipes 25 are employed for carrying water to and from each of the chambers 20, so as to effect a water-seal of the valve-member 22.

When using the valve, steam enters at the opening 6 and raises the valve-members 9 against the tension of their springs 15, so as to open the passageway for the steam through the valve, the steam passing out through the outlet opening 7. If at any time a vacuum be created in the passageway for the steam, the atmospheric pressure acting upon the valve-members 22 will move those members downwardly in the chambers 20 until the ends of springs 23 engage the stems 10 of the valves 9 and move the valves 9 downwardly upon their seats, so as to close the passageway for the steam through the valve. Should the pressure of the steam entering at the inlet opening 6 increase at any time thereafter, the valve-members 9 will be again raised from their seats so as to permit the steam to pass. In no case, however, can the vacuum formed in the piping leading from the outlet opening 7 extend back beyond the valve and into the piping leading to the inlet opening 6. The springs 24 upon the auxiliary valve-members 22 form a yielding connection between the auxiliary valve-members and the main valve-members, so that even if a vacuum be formed suddenly in the line leading from the outlet opening 7, the stems of the valve-members 22 will not be driven down hard upon the stems of the members 9. Also, these springs permit of operation of the valves 9 without moving the auxiliary valves 22, since the clearance between the ends of the stems 10 and the ends of the stems 23 is sufficient to permit of the normal operation of valves 9 without carrying the stems 10 into engagement with the stems 23. It will be seen that by manipulation of the handle 14, the tension of all of the springs 15, actuating the valves 9, may be regulated as desired from outside the casing of the valve, and also that in this way all of the valves 9 may be positively raised from their seats.

I wish it understood that the invention is not limited to the particular construction which I have illustrated and described, but that such construction can be modified materially to meet the conditions of use while still retaining the invention. Particularly, the invention is not limited to the use of the yielding connections from the auxiliary valve-members to the main valve-members except as to the claims which specifically set forth that construction, for I have found that there are conditions under which the best results from the use of the valve are obtained when rigid connections are employed from the auxiliary valve-members to their respective main valve-members.

Having now described my invention, what I claim as new therein and desire to secure by Letters Patent is as follows:—

1. A valve comprising a casing having a passageway therethrough provided with a valve-seat, a valve-member movable toward and away from said seat to close and open said passageway, said valve-member being adapted to rest normally upon its seat and to be raised therefrom by fluid pressure thereon, a second movable valve-member mounted upon said casing, a connection from the second valve-member to the exterior of said casing so that the second valve-member will be acted upon by the pressure of the atmosphere exterior to the valve, and means permitting the second valve-member to operate the first valve-member, substantially as set forth.

2. A valve comprising a casing having a passageway therethrough provided with a plurality of valve-seats, a plurality of movable valve-members, springs acting on said valve-members to hold them yieldingly upon their seats, a plurality of auxiliary valve-members movable upon the casing, means for subjecting all of the auxiliary valve-members to atmospheric pressure, and means connecting each of the auxiliary valve-members to one of the first-named valve-members so that the latter will be operated thereby, substantially as set forth.

3. A valve comprising a casing having a passageway therethrough provided with a valve-seat, a valve-member movable toward and away from said seat to close and open said passageway, a spring for holding the member yieldingly upon its seat, a chamber formed in the casing and connected to atmosphere, an auxiliary valve-member in the chamber of substantially the same area as said valve-member, and a connection between said valve-members to permit the auxiliary valve-member to close the main valve-member under predetermined conditions, substantially as set forth.

4. A valve comprising a casing having a passageway therethrough provided with a plurality of valve-seats, a plurality of movable valve-members, springs acting on said valve-members to hold them yieldingly upon their seats, a pressure-plate, means operated from outside the casing for moving said plate to regulate the tension of all said springs simultaneously, a plurality of auxiliary valve-members movable upon the casing, means for subjecting all of the auxiliary valve-members to atmospheric pressure, and means connecting each of the auxiliary valve-members to one of the first-named valve-members so that the latter will be operated thereby, substantially as set forth.

5. A valve comprising a casing having a passageway therethrough provided with a plurality of valve-seats, a plurality of movable valve-members, springs acting on said valve-members to hold them yieldingly upon their seats, a pressure-plate, means operated from outside the casing for moving said plate to regulate the tension of all said springs simultaneously, means operated by movement of said plate for raising all the valve-members from their seats, a dash-pot connected to each valve-member, a plurality of auxiliary valve-members movable upon the casing, means for subjecting all of the auxiliary valve-members to atmospheric pressure, and means connecting each of the auxiliary valve-members to one of the first-named valve-members so that the latter will be operated thereby, substantially as set forth.

6. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-chamber to atmospheric pressure, means for effecting a water-seal of the second valve-member, and means for permitting the second valve-member to operate the first valve-member, substantially as set forth.

7. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-member to atmospheric pressure, and a yielding connection between the valve-members, whereby the second valve-member can operate the first, substantially as set forth.

8. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-member to atmospheric pressure, a stem on the second valve-member, and a spring coiled about said stem and extending beyond the end of the same, said spring and stem being adapted to engage and operate the first-named valve-member, substantially as set forth.

9. A valve comprising a casing having a passageway therethrough provided with a plurality of valve-seats, a plurality of movable valve-members, springs acting on said valve-members to hold them yieldingly upon their seats, a pressure-plate, means operated from outside the casing for moving said plate to regulate the tension of all said springs simultaneously, a plurality of auxiliary valve-members movable upon the casing, means for subjecting all of the auxiliary valve-members to atmospheric pressure, and means for effecting a yielding connection from each auxiliary valve-member to one of the first-named valve-members so that the latter will be operated thereby, substantially as set forth.

This specification signed and witnessed this 28th day of July, 1911.

AXEL B. WALLEM.

Witnesses:
N. G. COOK,
ROBERT G. CLIFTON.

---

Copies of this patent may be obtained for five cents each, by addressing the "Commissioner of Patents, Washington, D. C."

It is hereby certified that in Letters Patent No. 1,024,236, granted April 23, 1912, upon the application of Axel B. Wallem, of Cynwyd, Pennsylvania, for an improvement in "Valves," an error appears in the printed specification requiring correction as follows: Page 3, line 38, for the compound word "valve-chamber" read *valve-member;* and that the said Letters Patent should be read with this correction therein that the same may conform to the record of the case in the Patent Office.

Signed and sealed this 21st day of May, A. D., 1912.

[SEAL.]

C. C. BILLINGS,
*Acting Commissioner of Patents.* plate to regulate the tension of all said springs simultaneously, a plurality of auxiliary valve-members movable upon the casing, means for subjecting all of the auxiliary valve-members to atmospheric pressure, and means connecting each of the auxiliary valve-members to one of the first-named valve-members so that the latter will be operated thereby, substantially as set forth.

5. A valve comprising a casing having a passageway therethrough provided with a plurality of valve-seats, a plurality of movable valve-members, springs acting on said valve-members to hold them yieldingly upon their seats, a pressure-plate, means operated from outside the casing for moving said plate to regulate the tension of all said springs simultaneously, means operated by movement of said plate for raising all the valve-members from their seats, a dash-pot connected to each valve-member, a plurality of auxiliary valve-members movable upon the casing, means for subjecting all of the auxiliary valve-members to atmospheric pressure, and means connecting each of the auxiliary valve-members to one of the first-named valve-members so that the latter will be operated thereby, substantially as set forth.

6. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-chamber to atmospheric pressure, means for effecting a water-seal of the second valve-member, and means for permitting the second valve-member to operate the first valve-member, substantially as set forth.

7. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-member to atmospheric pressure, and a yielding connection between the valve-members whereby the second valve-member can operate the first, substantially as set forth.

8. A valve comprising a casing having a passageway therethrough provided with a valve-seat, a valve-member movable toward and away from said seat to close and open said passageway, a spring for holding the member yieldingly upon its seat, a second movable valve-member mounted upon said casing, means for subjecting the second valve-member to atmospheric pressure, a stem on the second valve-member, and a spring coiled about said stem and extending beyond the end of the same, said spring and stem being adapted to engage and operate the first-named valve-member, substantially as set forth.

9. A valve comprising a casing having a passageway therethrough provided with a plurality of valve-seats, a plurality of movable valve-members, springs acting on said valve-members to hold them yieldingly upon their seats, a pressure-plate, means operated from outside the casing for moving said plate to regulate the tension of all said springs simultaneously, a plurality of auxiliary valve-members movable upon the casing, means for subjecting all of the auxiliary valve-members to atmospheric pressure, and means for effecting a yielding connection from each auxiliary valve-member to one of the first-named valve-members so that the latter will be operated thereby, substantially as set forth.

This specification signed and witnessed this 28th day of July, 1911.

AXEL B. WALLEM.

Witnesses:
N. G. COOK,
ROBERT G. CLIFTON.

---

Copies of this patent may be obtained for five cents each, by addressing the "Commissioner of Patents, Washington, D. C."

---

It is hereby certified that in Letters Patent No. 1,024,236, granted April 23, 1912, upon the application of Axel B. Wallem, of Cynwyd, Pennsylvania, for an improvement in "Valves," an error appears in the printed specification requiring correction as follows: Page 3, line 38, for the compound word "valve-chamber" read *valve-member;* and that the said Letters Patent should be read with this correction therein that the same may conform to the record of the case in the Patent Office.

Signed and sealed this 21st day of May, A. D., 1912.

[SEAL.]

C. C. BILLINGS,
*Acting Commissioner of Patents.*

It is hereby certified that in Letters Patent No. 1,024,236, granted April 23, 1912, upon the application of Axel B. Wallem, of Cynwyd, Pennsylvania, for an improvement in "Valves," errors appear requiring correction as follows: In the grant, line 10, for the words "a corporation of Pennsylvania" read *a copartnership;* line 17, for the words "its successors or assigns" read *their heirs or assigns;* and in the heading to the printed specification, for the words "a corporation of Pennsylvania" read *a copartnership;* and that the said Letters Patent should be read with these corrections therein that the same may conform to the record of the case in the Patent Office.

Signed and sealed this 10th day of June, A. D., 1913.

[SEAL.]

C. C. BILLINGS,
*Acting Commissioner of Patents.*

Copies of this patent may be obtained for five cents each, by addressing the "Commissioner of Patents, Washington, D. C."

It is hereby certified that in Letters Patent No. 1,024,236, granted April 23, 1912, upon the application of Axel B. Wallem, of Cynwyd, Pennsylvania, for an improvement in "Valves," an error appears in the printed specification requiring correction as follows: Page 3, line 38, for the compound word "valve-chamber" read *valve-member;* and that the said Letters Patent should be read with this correction therein that the same may conform to the record of the case in the Patent Office.

Signed and sealed this 21st day of May, A. D., 1912.

[SEAL.]

C. C. BILLINGS,

*Acting Commissioner of Patents.*

It is hereby certified that in Letters Patent No. 1,024,236, granted April 23, 1912, upon the application of Axel B. Wallem, of Cynwyd, Pennsylvania, for an improvement in "Valves," errors appear requiring correction as follows: In the grant, line 10, for the words "a corporation of Pennsylvania" read *copartnership;* line 17, for the words "its successors or assigns" read *their heirs or assigns;* and in the heading to the printed specification, for the words "a corporation of Pennsylvania" read *a copartnership;* and that the said Letters Patent should be read with these corrections therein that the same may conform to the record of the case in the Patent Office.

Signed and sealed this 10th day of June, A. D., 1913.

[SEAL.] C. C. BILLINGS,
*Acting Commissioner of Patents.*